United States Patent Office 2,948,692
Patented Aug. 9, 1960

2,948,692

SHEET COMPRISING LEATHER FIBERS, ETHYLENE OXIDE-DICYANDIAMIDE CONDENSATION PRODUCT AND RUBBER LATEX AND PROCESS FOR PREPARING SAME

Donald K. Pattilloch, New York, and Carl Polowczyk, Elmhurst, N.Y., assignors to Michigan Research Laboratories, Inc., Long Island City, N.Y., a corporation of Michigan, and Electro-Chem Fiber Seal Corporation, New York, N.Y., a corporation of Delaware No Drawing. Filed May 1, 1957, Ser. No. 656,222

6 Claims. (Cl. 260—8)

This invention relates to leather products and more particularly to leather products composed of leather particles and an elastomeric binder.

Products are known comprising leather particles and a binder therefor. Such prior art products are made by either filling a flat mold with a mixture of leather particles and binder or by forming a sheet on a make-up roll of a wet machine, thereafter pressing the sheet in the wet state and subsequently drying and curing the composite product. The operation is batchwise which is uneconomical and produces sheets of limited size.

It is among the objects of the present invention to produce leather products in continuous sheet form. Another object is to produce continuous leather sheets from shredded leather fibers by paper-making techniques and using paper-making equipment.

The method of the present invention generally involves treating an aqueous suspension of shredded leather with a condensation product of ethylene oxide and dicyandiamide, treating the suspension with a curable elastomeric latex, forming the suspension into a sheet and curing the latex.

The leather, generally shredded scrap leather, which may be tanned, is shredded to a fiber length of about ¼ inch. The leather is mixed with water to form a slurry and is agitated to thoroughly wet the leather fibres.

The condensation product added to the slurry is prepared by condensing dicyandiamide with a molar excess of ethylene oxide. The product is water soluble and its water solutions are alkaline. It is customarily supplied in 50% solids concentration, the liquid phase being water. It is obtainable commercially as Neovadine AN manufactured by Ciba Company, Inc.

The elastomeric later utilized in the present invention is of the low temperature-curing synthetic or natural latex type. Suitable latices include neoprene (poly-2-chloro-1,3-butadinene) and copolymers thereof containing low-temperature curing and accelerators. Leather decomposes on heating, while wet, hence an air cure at room temperature or at about 100° F. is necessary unless the sheet has been thoroughly dried, in which case higher temperatures may be used to effect a cure. The latex may also contain usual rubber additives.

*Example I*

To a shredded bark-tanned leather suspension in water was added 2% by weight of the dry leather of dicyandiamide-ethylene oxide condensation product (Neovadine AN in water solution). The suspension was agitated for one-half hour. Thereafter 25% (solids basis) of Neoprene 735 latex (a 40% neoprene aqueous latex containing air-cure accelerators) was added and agitation continued for one-half hour. The suspension was delivered to the head box of a pressure cylinder machine (Forming Machine Company). A thick web was produced, passed between press rolls (yielding a one-quarter inch leather sheet) and the web air dried at room temperature for 48 hours. The resulting leather sheet exhibited excellent flexibility, resistance to abrasion and high tensile strength superior to leather board made by presently-known techniques.

*Example II*

Example I was repeated using 2% by weight dicyandiamide-ethylene oxide condensation product and 33% on a solids basis by weight of Neoprene 735. The pH of the slurry was adjusted to pH 4.3 with formic acid before forming the sheet. The resulting leather sheet exhibited excellent properties superior to those of leather board made by presently-known methods.

*Example III*

Example I was repeated using 1% by weight dicyandiamide-ethylene oxide condensation product and 25% on a solids basis by weight of Neoprene 735. The sheet was cured at 100° F. for 6 hours, yielding an excellent leather sheet.

Continuous leather sheets may also be made on multicylinder board machines. Such sheets have a high degree of wet coalescence and after wet-pressing do not delaminate.

It has been found that about 1–2% ethylene oxide-dicyandiamide is effective to prepare leather sheets of good quality. About 20–40% (solids basis) of latex is effective. While the mechanism of the process is unknown, it appears that the ethylene oxide-dicyandiamine links the latex to the leather by chemical or electrostatic forces.

While the invention has been described in terms of certain examples, such examples are to be considered illustrative rather than limiting, and it is intended to cover all modifications and embodiments that fall within the spirit and scope of the appended claims.

What is claimed is:

1. The process of producing a leather sheet comprising the steps of forming an aqueous suspension of shredded leather fiber, adding an ethylene oxide-dicyandiamide condensation product to said suspension, thereafter adding to the suspension a curable elastomeric latex selected from the group consisting of polymers of 2-chloro-1,3-butadinene and natural rubber, forming the suspension into a sheet and curing the elastomer.

2. The process set forth in claim 1 wherein said latex is poly-2-chloro-1,3-butadiene.

3. A leather sheet comprising shredded leather fiber containing an ethylene oxide-dicyandiamide condensation product bonded together by a cured elastomer, selected from the group consisting of polymers of 2-chloro-1,3-butadiene and natural rubber.

4. The leather sheet set forth in claim 3 wherein said elastomer is poly-2-chloro-1,3-butadiene.

5. The process set forth in claim 1 wherein the latex is natural rubber latex.

6. The leather set forth in claim 3 wherein the elastomer is natural rubber.

References Cited in the file of this patent

UNITED STATES PATENTS

| | | |
|---|---|---|
| 2,320,225 | Ericks | May 25, 1943 |
| 2,370,457 | Gocher et al. | Feb. 27, 1945 |
| 2,381,774 | Riefenstahl | Aug. 7, 1945 |
| 2,769,712 | Wilson | Nov. 6, 1956 |